United States Patent [19]
Dick

[11] 4,110,913
[45] Sep. 5, 1978

[54] AUTOMOBILE FRONT END ALIGNMENT EQUIPMENT

[76] Inventor: Roy E. Dick, 3758 Blue Rock Rd., Cincinnati, Ohio 45239

[21] Appl. No.: 483,705

[22] Filed: Jun. 27, 1974

Related U.S. Application Data

[60] Continuation-in-part of Ser. No. 205,260, Dec. 6, 1971, which is a division of Ser. No. 757,190, Aug. 5, 1968, Pat. No. 3,643,337, which is a continuation-in-part of Ser. No. 368,460, May 19, 1964, Pat. No. 3,457,653.

[51] Int. Cl.² .................. G01B 13/195; G01B 19/295; G01B 5/255
[52] U.S. Cl. .................................... 33/336; 33/203.12; 33/203.18
[58] Field of Search ................ 33/203.18, 203, 203.12, 33/203.13, 336, 203.15, 337, 336

[56] References Cited

U.S. PATENT DOCUMENTS

| 1,974,006 | 9/1934 | Bennett | 33/203 X |
| 2,581,630 | 1/1952 | Carrigan | 33/336 |
| 2,603,881 | 7/1952 | Holaday | 33/203.15 |

Primary Examiner—William D. Martin, Jr.
Attorney, Agent, or Firm—James W. Pearce; Roy F. Schaeperklaus

[57] ABSTRACT

Automobile front end alignment equipment in which a platform comprised of a pair of trucks correlated for like orientation while free for universal movement on a horizontal surface, supports respective carriages for free swinging about respective vertical axes, which carriages engagingly support front wheels of a vehicle in predetermined relation to the wheels of a vehicle, and a bracket attachable to a wheel whereby correlated toe-in toe-out and camber of wheels may be simultaneously measured.

10 Claims, 18 Drawing Figures

AUTOMOBILE FRONT END ALIGNMENT EQUIPMENT

This application is a continuation-in-part of my copending application Ser. No. 205,260 filed Dec. 6, 1971 which is a division of my application Ser. No. 757,190 filed Aug. 5, 1968, now U.S. Pat. No. 3,643,337, which is a continuation-in-part of my patent application Ser. No. 368,460 filed May 19, 1964, now U.S. Pat. No. 3,457,653.

This invention relates to devices for aligning wheels of an automotive vehicle or the like. In particular, this invention relates to a device having electrically operated gauges which indicate the camber of wheels and the degree of toe-in or toe-out of the wheels of a vehicle.

An object of this invention is to provide a device which can be mounted on a wheel and which, upon adjustment in place on the wheel, indicates on a galvanometer the degree of camber of the wheel.

A further object of this invention is to provide such a device in which an upright column can be attached to a wheel and in which an indicator arm pivotally connected to the column can be adjustably swung to a horizontal position and in which swinging of the adjustment arm actuates a potentiometer to cause registry on a galvanometer of a value determined by the degree of camber of the wheel.

A further object of this invention is to provide such a device in which an upright column can be attached to a wheel and in which an indicator arm pivotally connected to the column can be adjustably swung relative to a horizontal position and in which swinging of the adjustable arm actuates a potentiometer to cause registry on a galvanometer of a value determined by the degree of camber of the wheel.

A further object of this invention is to provide a device for measuring the degree of toe-in or out of a vehicle in which the wheels are positioned on rollers carried by carriages which can swing as the wheels are rotated and in which a linkage is connected to each carriage for operating a potentiometer, the reading of the potentiometers being determined by the degree of swinging of the carriage caused by the toe-in or toe-out of the wheels mounted thereon.

A further object of this invention is to provide such a device in which each carriage cooperates with a fork or gear connected to one of the potentiometers for swinging or turning the potentiometer to a degree determined by the degree of swinging of the carriage and in which each potentiometer is connected to a galvanometer which provides readings indicating the degree of swinging of the carriage.

A further object of this invention is to provide such a device mounted on a carriage and in which the upright column can be attached to a wheel engaging indicator arm pivotally connected to the column for adjustable swinging relative to a horizontal position by cooperation with a wheel engaging the carriage such that swinging of the adjustable arm actuates a potentiometer to cause registry on a galvanometer of a value determined by the degree of camber of the wheel.

A further object of this invention is to provide such a device in which the carriages are mounted on respective trucks which are in cooperation with a truck correlating bar and spaceable from one another in relation to the vehicle wheel tread spacing.

A further object of this invention is to provide at least one truck with supporting wheels which permit free shifting in any substantially horizontal direction.

A further object of this invention is to provide on each carriage, roller structure which so cooperates with a vehicle wheel tire thereon that the carriage and truck are urged to seek location in central lateral relation beneath said tire.

A further object of this invention is to provide such a device in which the galvanometers are located in association on a console for simultaneous reading and comparison.

A further object of this invention is to provide such a device in which motor driven rollers of the carriage cause rotation of the wheels of the vehicle.

The above and other objects and features of the invention will be apparent to those skilled in the art to which this invention pertains from the following detailed description, and the drawings, in which.

In the following detailed description and the drawings, like reference characters indicate like parts.

Figures 1, 2, 3, 4, 9:
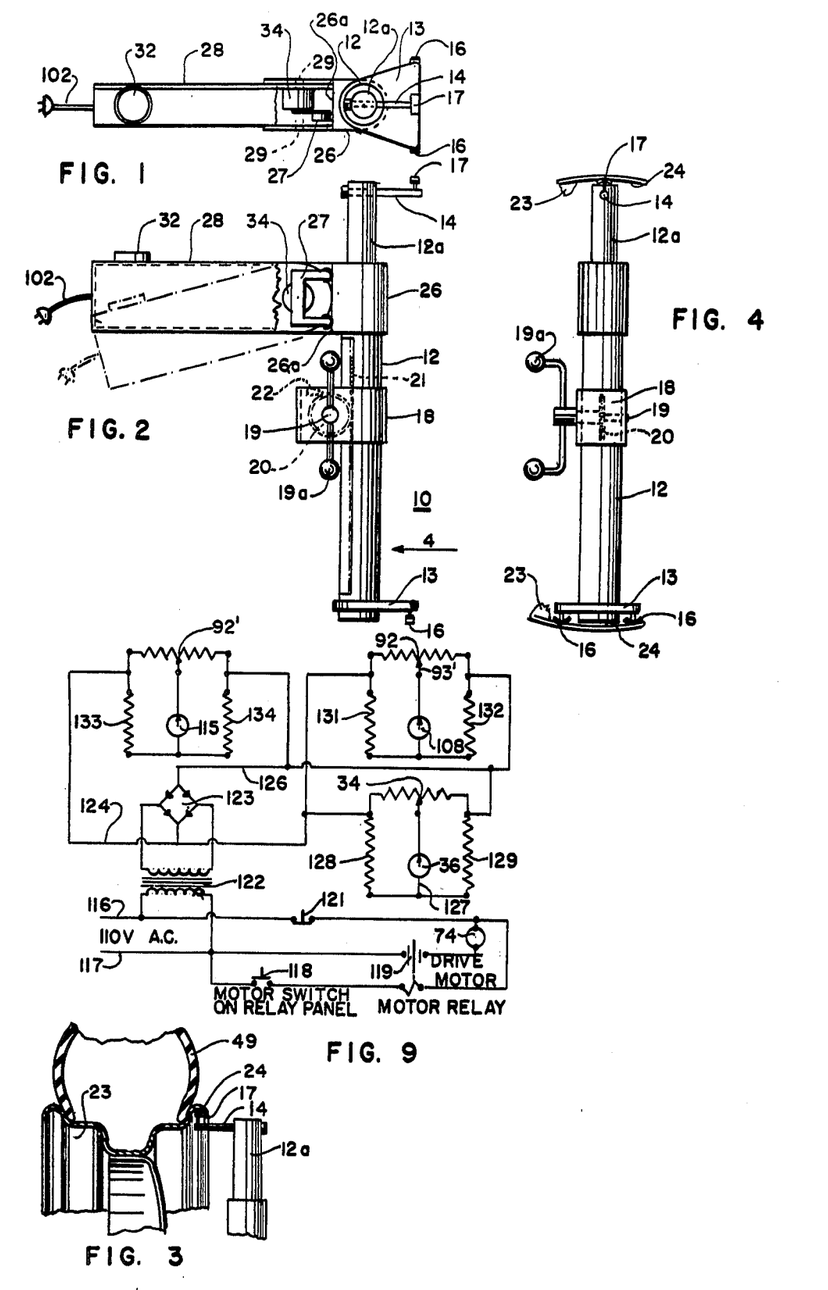
FIG. 1 is a plan view of a device for determining camber of a wheel, the device being constructed in accordance with an embodiment of this invention.
FIG. 2 is a view in side elevation of the device illustrated in FIG. 1 partly broken away and in section to reveal interior construction, an alternate position of an actuator arm thereof being indicated in dot-dash lines.
FIG. 3 is a fragmentary view in transverse section showing the device mounted on a wheel of a vehicle.
FIG. 4 is a view in side elevation taken in the direction of arrow 4 in FIG. 2.
FIG. 9 is a schematic wiring diagram of the device.

In FIGS. 1, 2, and 4 inclusive is illustrated a camber determining device indicated generally at 10, which forms a portion of an alignment determining device constructed in accordance with an embodiment of this invention. The device 10 includes an upright column or main bracket 12 on which is mounted a stationary bracket 13 and an extension portion 12a carrying a movable bracket 14. The stationary bracket 13 carries a pair of abutment members 16. The movable bracket 14 carries a single abutment member 17. The movable bracket 14 includes a main bar secured to extension portion 12a of the main bracket. An arm 18 is mounted on main bracket 12 and transverse horizontal shaft 19 is journalled therein. Shaft 19 is rotatable by means of crank handle 19a and carries pinion gear 20 in mesh with rack teeth 21 of extension portion 12a. A lock pawl 22 is pivotally mounted on arm 18 for use in locking pinion 20 to secure extension portion 12a against telescoping into main bracket 12. The column can be mounted in engagement with a front wheel 23 of a vehicle, as indicated in FIGS. 3 and 4, with the ball members 16 and 17 engaging a rim portion 24 of the wheel. A hinge member 26 (FIGS. 1 and 2) is fixedly attached to the column 12. The column is mounted with the hinge member 26 extending transversely of the wheel and the axis of the hinge substantially horizontal. An actuator arm 28 is pivotally mounted on hinge pins 29 (FIG. 1) carried by the hinge member 26 and can swing from the position shown in full lines in FIG. 2 to positions such as the one shown in dot-dash lines in FIG. 2. A potentiometer 34 is mounted in the actuator arm 28 and the stationary fork 27 mounted on the shaft of potentiometer 34 cooperates with surface 26a of member 26. A bubble level 32 (FIGS. 1 and 2) is mounted on the actuator arm 28 so that, as the actuator arm is swung between the positions illustrated in FIG. 2, the position at which the actuator arm 28 is horizontal can be determined from the bubble level 32. The potentiometer 34 mounted on actuator arm 28 rotates about a shaft thereof which is held against rotation, that is in fixed relation to hinge member 26 by fork 27 carried on said shaft, so that, as the actuator arm 28 is swung up or down, the movable contact of the potentiometer moves along the coil thereof. A galvanometer 36 is connected to the potentiometer 34 and, as the movable contact of the potentiometer moves along the coil thereof, the reading of the galvanometer is varied, and the reading of the galvanometer indicates the degree to which the position of the column varies from the vertical, thus indicating the degree of camber of the wheel. The electrical connections between the potentiometer 34 and the galvanometer 36 will be described in greater detail hereinafter in connection with the overall electrical circuitry of the device.

Figure 5:
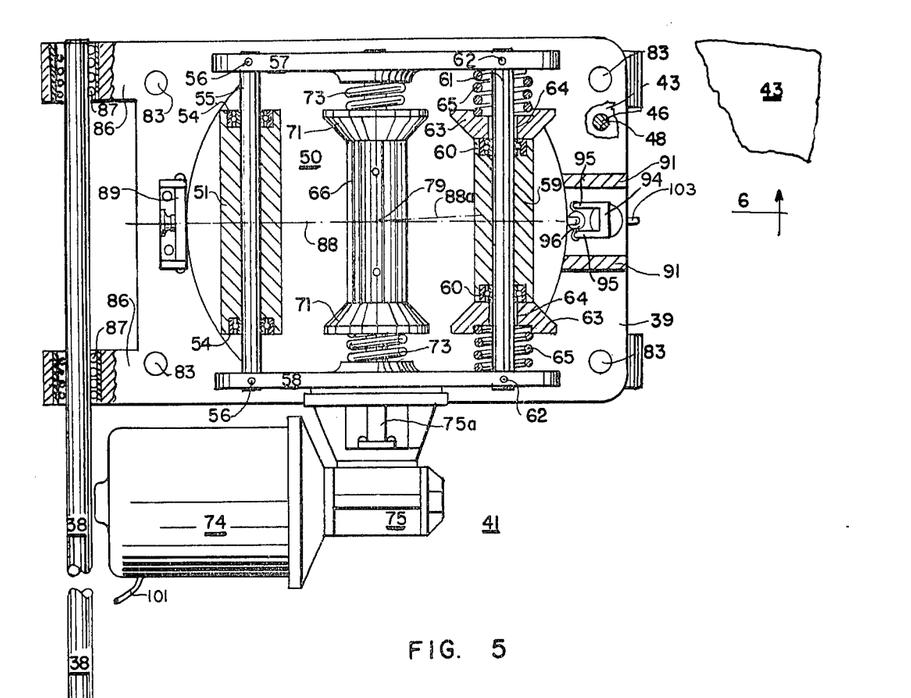
FIG. 5 is a plan view of a portion of the device for determining the degree of toe-in or out of wheels; portions of ramps thereof being omitted, the center line of the operative position of tires on the wheels being shown in dot-dash lines.
Figure 6:
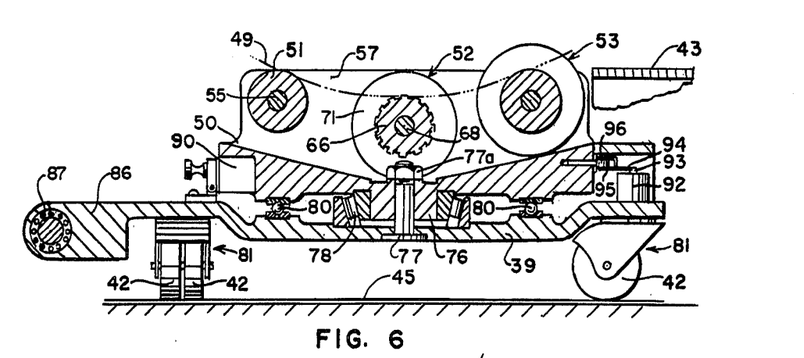
FIG. 6 is a view in vertical section taken on the line 6—6 in FIG. 5, and portions being omitted for clarity.
Figure 6A:
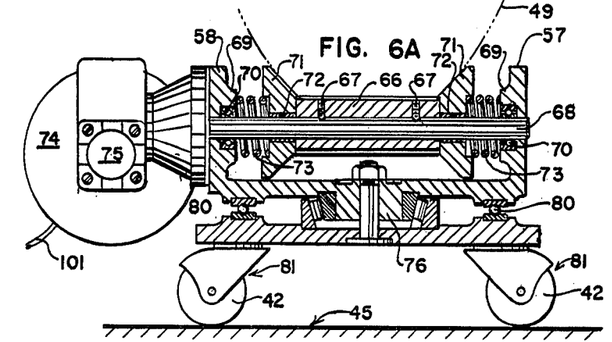
FIG. 6A is a view in vertical section taken on the line 6A—6A in FIG. 5.
Figure 7:
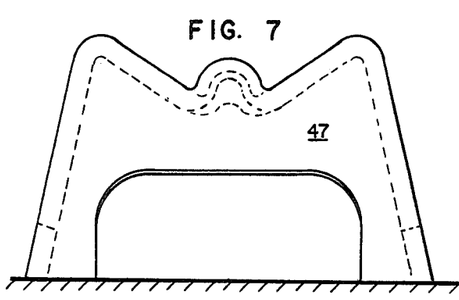
FIG. 7 is a view in side elevation of a rear wheel support stand.
Figure 7A:
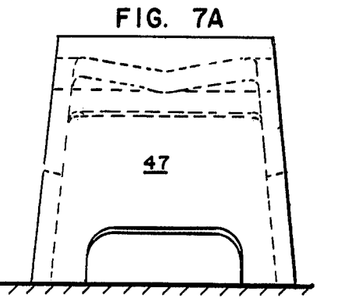
FIG. 7A is a view in end elevation of the rear wheel support stand shown in FIG. 7.

When the degree of camber of the wheel has been determined with the aid of the camber-determining device 10, any adjustments needed in the camber of the wheel can be made. Then, the camber-determining device can be temporarily removed from the wheel and used in similar manner in connection with the second front wheel, and the front wheels then placed in cooperative relation on toe-in alignment platform 41 (shown in FIGS. 5, 6, and 6A) and the rear wheels are supported at like elevation as by stands 47 which as shown in FIGS. 7 and 7A may have an upper contour similar to that of rollers 51, 52, and 53. The platform 41 is comprised of bar 38 and trucks 39, 40 supported on wheels 42, which support the platform trucks 39, 40 in substantially horizontal position. In such placement of the front wheels, ramps 43 and 44 can be used and are temporarily attached to the trucks 39, 40 of platform 41 by means of pins 46. The pins 46 extend through integral portions of the ramps, and are received in upright bores 48 (FIG. 5) in the trucks 41. The ramps can guide wheels of a vehicle into position on mechanism carried by the trucks 39, 40 on which tires 49 of the vehicle are shown in FIGS. 6 and 6A. The trucks 39, 40 and the mechanism carried thereby are in large degree duplicates and like reference characters will be applied to like parts thereof. When the wheels of a vehicle are in the position shown in FIGS. 6 and 6A, each tire is disposed on rollers 51, 52, and 53 (FIGS. 5, 6, and 6A). The rollers 51, 52, and 53 are mounted on a swinging carriage 50 which in turn is mounted on a respective one of trucks 39, 40 for swinging about a substantially vertical axis 79.

Roller 51 is journalled on bearings 54 mounted on shaft 55 which is in turn supported by carriage 50 to which it is fixed adjacent its ends by pins or set screws 56. Roller 51 is centered on shaft 55 between side flanges 57, 58 of carriage 50.

Roller 53 comprises a cylindrical central portion 59 mounted in bearings 60 mounted on shaft 61 which is in turn supported by carriage 50 to which it is fixed adjacent its ends by pins or set screws 62. The cylindrical central roller portion 59 is mounted on shaft 61 in centered relation between side flanges 57, 58 of carriage 50. Laterally of cylindrical central roller portion 59, a pair of frusto-conic roller portions 63 are mounted by bearings 64 for rotation on shaft 61. As shown the small diameter ends of roller portions 63 are adjacent roller portion 59. Compression springs 65 are provided annularly of shaft 61 between frusto-conic roller portions 63 and carriage side flanges 57, 58 to urge roller portions 63 toward roller portions 59. A thrust bearing, not shown, may be provided between springs 65 and roller 63 to reduce frictional drag and wear. Thus roller portions 59 and 63 may rotate on shaft 61 at different speeds depending upon their engagement with a driving member such as tire 49.

Roller 52 comprises a cylindrical central roller portion 66 mounted by means such as set screws 67 in fixed relation to shaft 68 for rotation therewith and of a width slightly shorter than the transverse width of the tire treads which will cooperate therewith. Roller portion 66, so mounted, is centered between carriage side flanges 57, 58. As shown in FIG. 5, side flanges 57, 58 may have integral boss portions 69 and support journal bearings 70 for shaft 68. Laterally of cylindrical central roller portion 66, a pair of frusto-conic roller portions 71 are mounted by bearings 72, for rotation on shaft 68. The small diameter ends of roller portions 71 are adjacent roller portion 66. Compression springs 73 are provided annularly of shaft 68 between frusto-conic roller portions 71 and carriage side flanges 57, 58 to urge roller portions 71 toward roller portion 66. A thrust bearing, not shown, may be provided between spring 73 and roller 71 to reduce frictional drag and wear. Thus frusto-conic roller portions 71 may rotate relative to shaft 68 and central roller portion 66 at speeds dependent upon their engagement with a driving member such as tire 49.

Shaft 68, journalled for rotation in bearings 70 is thus supported by carriage 50.

A motor 74 having an angle drive speed reduction gear box 75, is mounted on carriage 50 with its output shaft 75a in driving relation to shaft 68 such that cylindrical central roller portion 66 may by operation of motor 74 apply driving power to tire 49 to rotate same.

As shown in FIGS. 6 and 6A, carriages 50 each have a central hub boss 76 through which retaining bolt 77 extends and annularly of which a tapered roller bearing 78 supports carriage 50 for rotation about the central vertical axis 79. An additional thrust bearing 80 is provided annularly of hub boss 76 to support the carriage adjacent the periphery thereof. Bolt 77 in cooperation with nut 77a (and suitable washers and the like not shown) provide initial load on the bearings 78, 80 and preclude separation of the carriage from the truck.

Each truck 39 and 40 is provided with means for easy rolling movement in any direction over surface 45 which as shown may be a plurality of supporting casters 81, which as shown are preferably of a type which readily roll in any direction and thus facilitate movement of the truck in any direction. The axis about which the casters shown swivel, lies in a plane between the dual wheels 42 thereof and is coincident with the axis of the caster shank or tang 83.

Means are provided for retaining the trucks 39, 40 in abreast relation while permitting them to seek spacing related to the tread spacing of the wheels 49 supported on carriages 50. As shown truck 40 has a pair of projecting arms 84 in which bar 38 is secured in fixed relation and extending horizontally perpendicular to the centerline 85 of truck 40. Truck 39 has a pair of arms 86 in which low friction bearings 87 are provided. Bar 38 is received in cooperative relation to bearings 87 such that truck 39 may move freely toward and away from truck 40 while the truck centerlines 88 and 85 remain parallel. The swinging carriages 50 are supported on bearings 78, 80 so that the carriages can swing freely of the pivots thereof. However, swingable lock dogs 89 are provided for locking the carriages by clockwise swing of the dog from the position shown in FIG. 6 into notch 90. The swinging carriages 50 may thus be locked in centered position, the trucks shifted as needed to place the carriage to receive the wheel before the wheels are moved into position on the rollers thereof.

When the wheels have been mounted on the rollers 51, 52, and 53, the dogs 89 are released and through operation of motors 74 the rollers and wheels are rotated in unison. As the wheels 49 rotate, driven by roller portions 66 in cooperative engagement with the tire treads, the frusto-conic faces of the roller portions 63, 71 engage the side walls of the tire outboard of the tread and urge the tire to center on roller portions 51, 66, and 59. Such centering of the tire will urge the trucks 39, 40 to spaced relation such that the spacing of the centerline of the tire treads will substantially equal the spacing of the centerlines of the respective trucks. Simultaneously the carriages 50, free to rotate about their axes 79, swing into positions in which their centerlines respectively coincide with the centerline of the respective engaging tire tread.

Each truck-carriage assembly has means for sensing and communicating the relative position of axial rotation of the carriage to the truck. Each truck, as shown, has a protective housing 91 in which a potentiometer 92 is mounted in fixed relation to the truck with its shaft 93 vertical. A fork 94 mounted on shaft 93 has a pair of horizontal arms 95 (FIG. 5) between which finger or roller 96 projects. Finger or roller 96 projects radially horizontally from carriage 50, as illustrated in FIGS. 5 and 6, into contact with arms 95.

Figure 8:
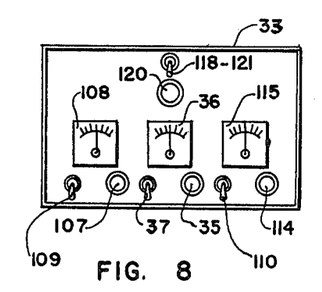
FIG. 8 is a view in front elevation of a control console.
Figure 8A:
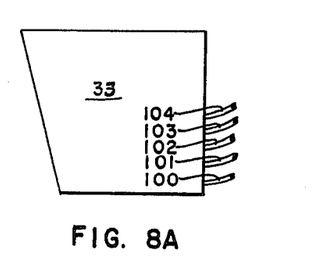
FIG. 8A is a view in end elevation of the console of FIG. 8.

As the rollers 66 are rotated to turn the vehicle wheels, the swinging carriage 50 can swing from the neutral position shown in full lines to a position such as that indicated in dot-dash lines at 85a, 88a, the amplitude of swinging being determined by the degree of "toe-in" or "toe-out" of the tires 49. As the swinging carriage 50 swings, angular rotation of carriage 50 about axis 79 thus results in related rotation of potentiometer shaft 93, which extends into and operates a movable contact 93' of potentiometer 92. As shown in FIG. 9, the potentiometer 92 is connected to a galvanometer 108 in such a manner that the reading of the galvanometer 108 indicates the degree to which the movable contact of the potentiometer is displaced incident to the swinging of carriage 50 of truck 39 (FIG. 5). Similarly, a potentiometer 92' on truck 40 is operated by carriage 50 on truck 40. The potentiometer 92' is connected to a galvanometer 115 (FIG. 9), and the reading of the galvanometer 115 indicates the degree of displacement of the movable contact of the potentiometer 92' incident to swinging of the swinging carriage 50 of truck 40 (FIG. 5). Carriage 50 may have provision for mounting of finger or roller 96 in a plurality of predetermined stations corresponding to positions which wheels assume when turned for steering the vehicle. As shown in FIG. 8, the galvanometers 36, 108, 115 and motor switch 118–121 are mounted in console 33 and may have associated pilot lights 35, 107, 114, 120 for indicating when the respective circuits are energized. The circuits containing galvanometers 36, 108, 115 respectively may be controlled by switches 37, 109, and 110.

The electric circuitry of the device is shown in FIG. 9. Electric power is supplied through power leads 116 and 117. Operation of the drive motors 74 is initiated by closing of a motor switch 118 which energizes motor starting relays 119 (of which one is shown). The motors can be stopped by opening a motor stop switch 121.

Power for the galvanometers and potentiometers is supplied through a transformer 122 and a rectifier 123 which supplies unidirectional current of appropriate voltage across leads 124 and 126. Coils of the potentiometers 34, 92 and 92' are connected across the leads 124 and 126. One lead of the galvanometer 36 is attached to a line 127 which is connected to the leads 124 and 126 through equal voltage dividing resistors 128 and 129, respectively, so that the line 127 is at a potential mid-way between the voltages of the leads 124 and 126. The movable contact of the potentiometer 34 is connected to the other side of the galvanometer 36 so that the galvanometer 36 has a zero reading when the movable contact of the potentiometer 34 is centered on the coil thereof, and displacement of the movable current in opposite directions causes deflection of the indicator of the galvanometer 36 in opposite directions. In a similar manner, one lead of the galvanometer 108 is connected between voltage dividing resistors 131 and 132 connected to the leads 124 and 126 respectively, and the other lead of the galvanometer 108 is connected to the movable contact of the potentiometer 92. The galvanometer 115 is similarly connected between voltage dividing resistors 133 and 134 which are connected to the leads 124 and 126, respectively, and to the movable contact of the potentiometer 92'. Thus, each galvanometer registers the degree to which the movable contact of the potentiometer associated therewith is displaced from a zero reading. From the galvanometer 36 is determined the degree of the camber of a wheel. If desired a second camber determining device 10 with a respective galvanometer 36 can also be used to obtain simultaneous determination of camber of a second wheel. From the galvanometers 108 and 115 is determined the degree of toe-in or toe-out of the wheels, and from these readings can be determined the degree and type of adjustments required to correct alignment of the wheels.

Cable 100 provides electrical connection between the power source and console 33, while console 33 and motors 74, potentiometers 34, 92 and 92' are respectively provided by cables 101, 102, 103 and 104.

FIGS. 10-15 disclose an embodiment of the invention having portions of construction varied from that of the embodiment illustrated in FIGS. 1-9 and described above.

Figure 10:
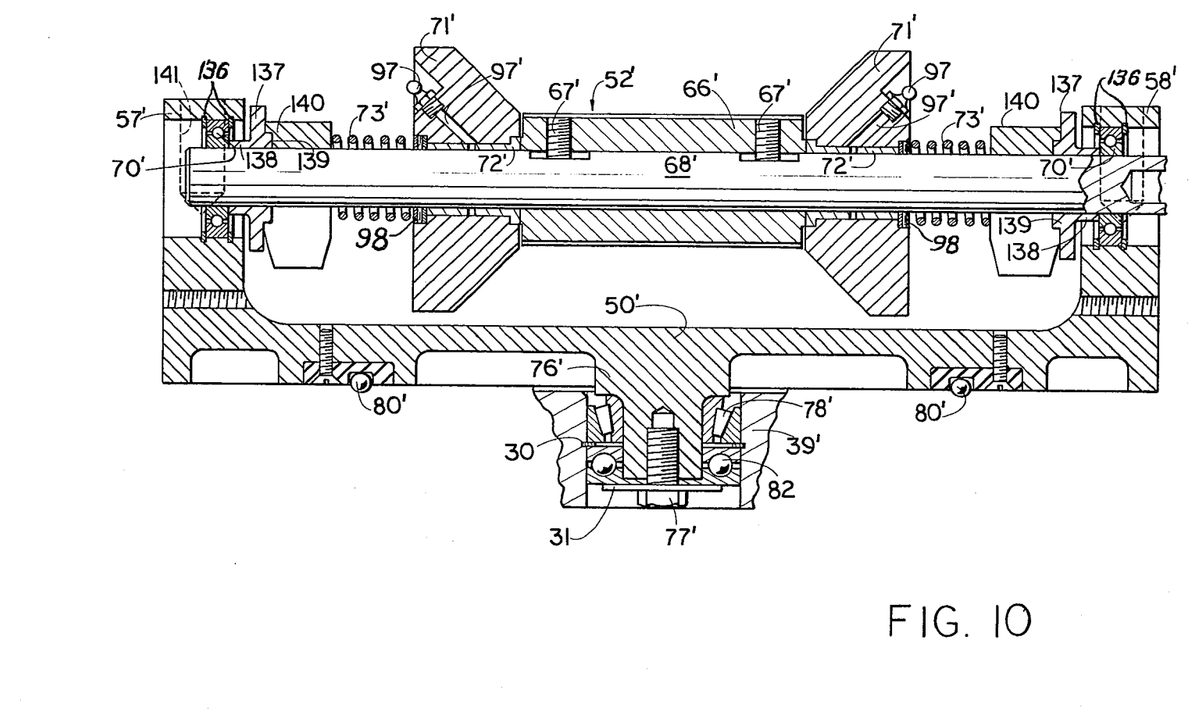
FIG. 10 is a fragmentary view in vertical transverse section similar to FIG. 6A but of a modified carriage structure.

In FIG. 10 is shown carriage 50' mounted on truck 39' for swinging movement about a vertical axis in response to small forces. The central hub boss 76' of carriage 50' is journalled in tapered roller bearing 78' seated on stop-ring 30. Retaining bolt 77' cooperates through thrust washer 31 with thrust bearing 82 in turn seated against the underside of stop-ring 30 to take up play and preload bearing 78' and additional thrust bearing 80.

Carriage 50' has side flanges 57' 58'. Shaft 68, one of a pair of parallel similar shafts corresponding to shafts 61 and 68, is supported by flanges 57' and 58'. Shaft 68' is supported for rotation in ball bearings 70' in turn respectively mounted between stop-rings 136 in flanges 57' 58'. Thrust spacers 137 are provided inboard of bearings 135 and have oppositely extending shoulders 138, 139 annularly of shaft 68. Shoulder 138 abuts bearing 70'. A pair of saddle shims 140 are provided astride shaft 68' inboard of the thrust spacers 137. Annularly of shaft 68, shims 140 have a recess in which thrust spacer shoulder 139 is received to retain the saddle shim astride shaft 68'. Centrally of shaft 68', a composite roller 52' is provided. Central portion 66' is a longitudinally ribbed cylinder fixed by screws 67' to the shaft 68' between outer frusto-conic portions 71' which are mounted on respective bearing sleeves 72' for rotation about shaft 68' and for movement longitudinally of shaft 68' as well. Portions 71' may be provided with lubrication fittings 99 and channels 97'. A recess annularly of shaft 68' is provided in the outboard end of each frusto-conic portion 71' and a roller thrust bearing 98 is provided therein annularly of shaft 68' for abutting cooperation with spring 73'. Springs 73' are preloaded in compression between saddle shims 140 and the roller thrust bearings 98. The roller portions 71' cooperate with the side walls of a tire resting in cooperation on central portion 66' as the corresponding portions of roller 52 previously described. However, when a tire having an exceptionally wide tread is placed in cooperative relation on roller 52, the springs 73 cannot be compressed enough to permit sufficient spacing of roller portions 71 and, as a result the tread, rather than the side walls of the tire, engages the roller portions 71 in FIGS. 5-7. The structure of FIG. 10 on the other hand will cooperate not only with tires of normal tread widths, but with those of exceptionally wide tread width as well. For the latter, the saddle shims are disengaged from shoulders 139 by prying the shims toward the roller portions 71' and then the shims are removed by lifting them away from the shaft 68'. Springs 73' then abut the radial face of a shoulder 139 and frusto-conic portions 71' of roller 52' are advanceable into greater spaced relation wherein they properly cooperate with the sidewalls of an exceptionally wide treaded tire with which portions 71 or roller 52 cannot properly cooperate.

Figure 11:
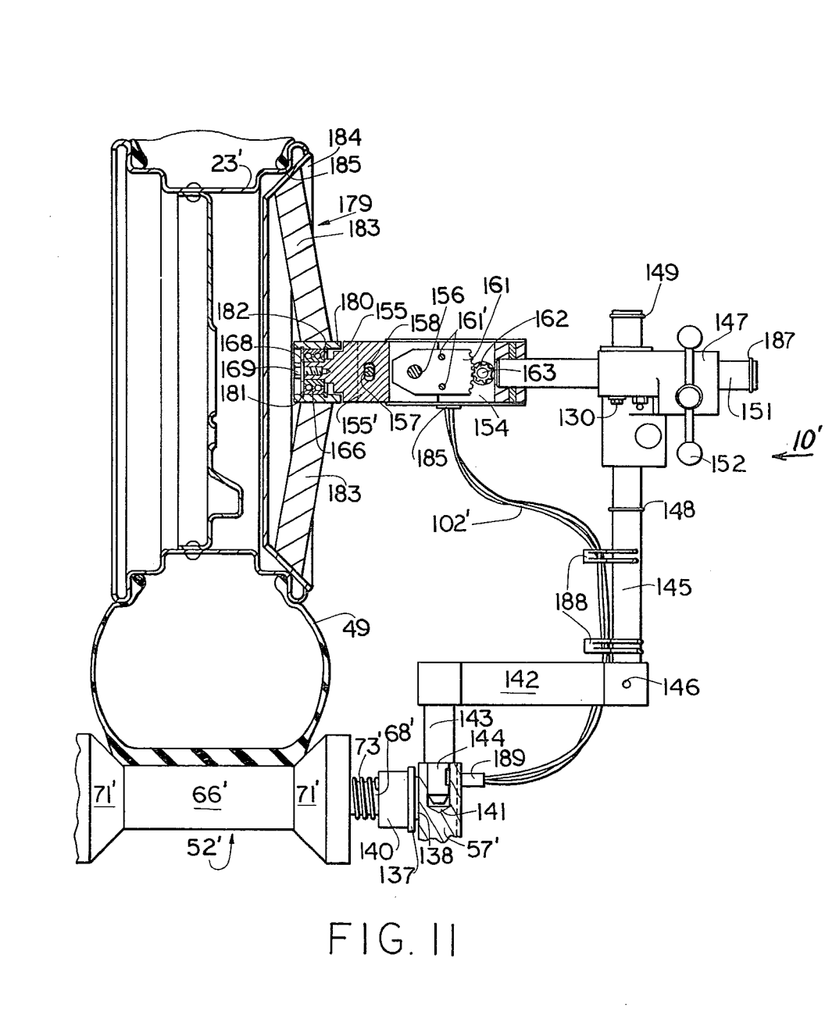
FIG. 11 is a view in transverse vertical section showing a camber determining device mounted on a carriage illustrated in FIG. 10 and in engagement with a wheel, the tire on which is in cooperation with the carriage rolls.
Figure 12:
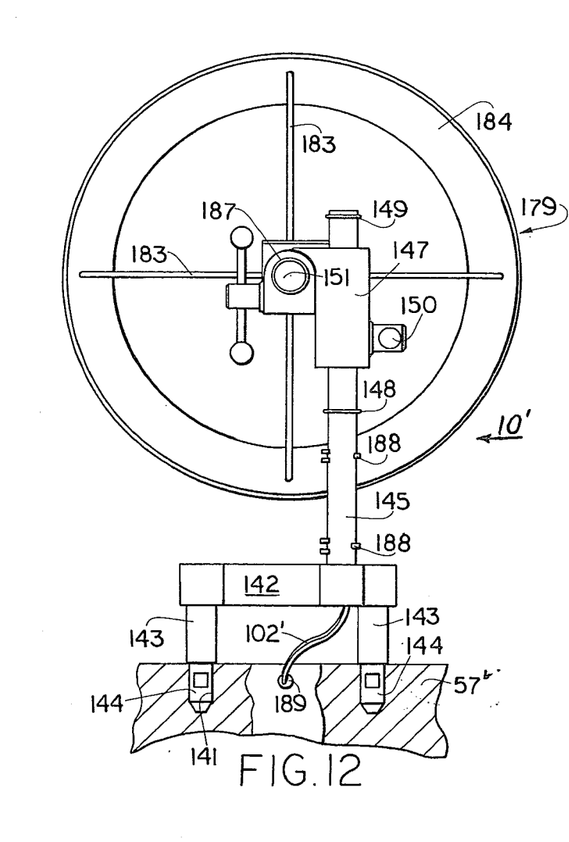
FIG. 12 is a fragmentary side view in elevation of the structure shown in FIG. 11.
Figures 13, 14, 15:
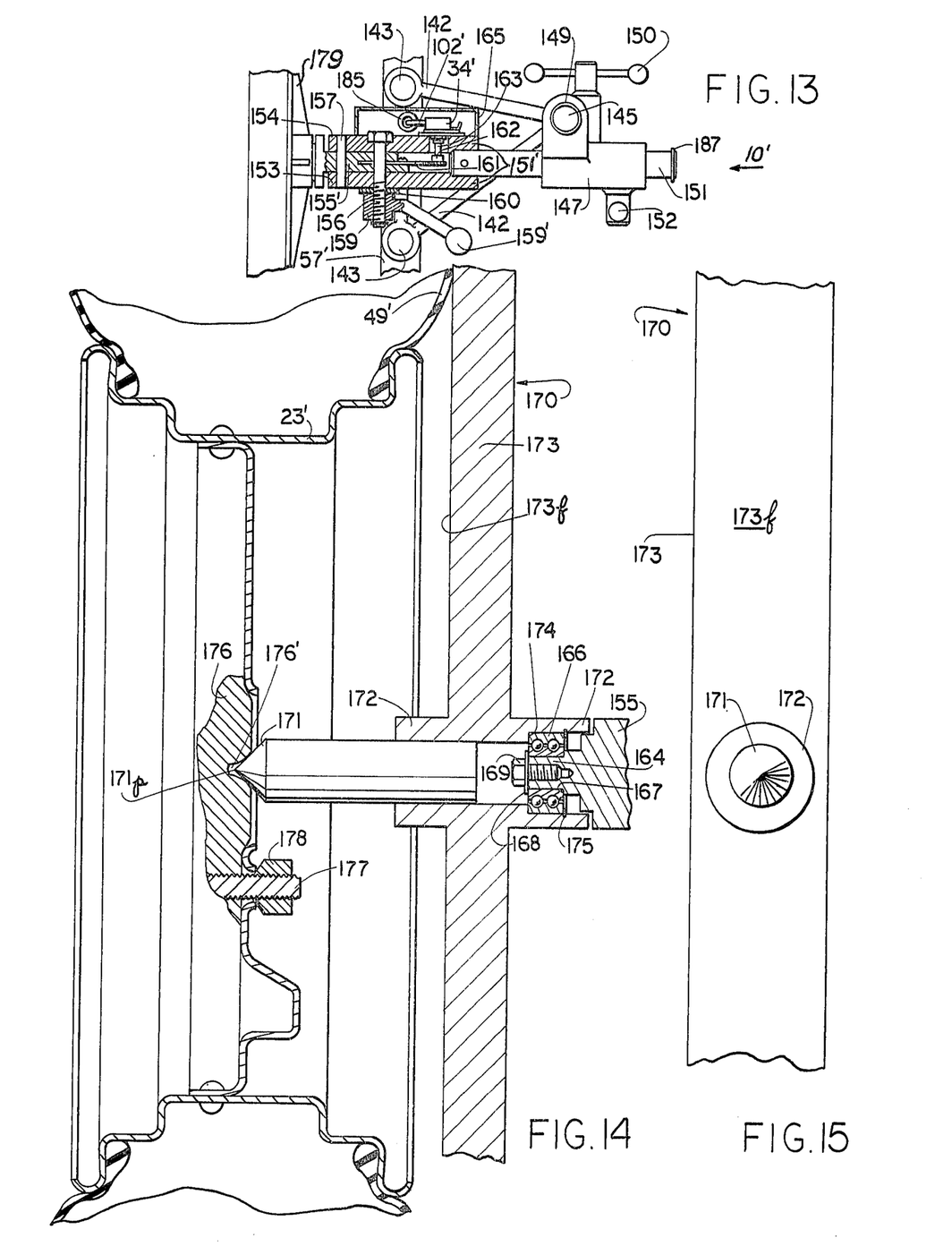
FIG. 13 is a fragmentary top plan view, partly in section, of the camber determining device of FIGS. 11 and 12.
FIG. 14 is a fragmentary view in vertical section of the camber determining device of FIGS. 11-13 with a set-up head substituted for the reading head.
FIG. 15 is a fragmentary view in vertical elevation of the set-up head of FIG. 14.

Also constructed in accordance with the invention is the modified device 10' for sensing caster, illustrated in FIGS. 11-15. As shown in FIGS. 10, 11, and 13, a pair of upwardly facing sockets 141 are provided in each side flange 57'. The device 10' has a generally horizontally extending frame 142, downwardly from which extends a pair of spaced parallel legs 143, the lower extremities of which are plug portions 144 of reduced diameter and adapted to be received in respective sockets 141 so as to securely support the frame 142 in fixed predetermined relation to the carriage 50'. An upright column 145 extends upwardly from frame 142 to which it is secured in any suitable fashion such as by pin 146. A carrier 147 is slidably mounted on column 145, and its sliding movement is limited by lower stop ring 148 and upper stop ring 149. Carrier 147 is provided with lock means actuatable by handle 150 to secure it in fixed relation to column 145. Carrier 147 supports horizontal arm 151 for longitudinal reciprocation to position it relative to carrier 147, and lock means actuatable by handle 152 are provided for securing arm 151 in selected fixed relation to carrier 147. Horizontal arm 151 has an enlarged end portion 151' bifurcated to form a pair of spaced parallel arms 153, 154 between which head tang 155' is received such that pivot bolt 156 extends through arm 153, tang 155' and arm 154 to pivotally relate same. The relative pivotal movement of tang 155' about pivot bolt 156 is limited by limit pin 157, the central portion of which is received in slot 158 provided in tang 155' and the respective end portions of which are securely supported in arms 153, 154. To lock the head tang in any position within the limits of its pivoting, a locking nut 159 having handle 159' is provided in threaded engagement with pivot bolt 156 outboard of washer 160 in order that by swinging of handle 159' the arms may be clamped toward each other to lockingly grip the intervening tang 155' or to release same as the case may be. Gear sector 161 is secured on tang 155' by screw 161'. Sector 161 is in engagement with pinion 162 in turn mounted on the rotatable shaft 163 of potentiometer 34'. The body of potentiometer 34' is mounted securely on arm 154 and enclosed in a protective housing 165. Head 155 on tang 155' is adapted for mounting setup and sensing structures thereon.

Head 155 has an extending shoulder 164 of reduced diameter, annularly of which a ball bearing 166 may be mounted and secured between radial shoulder face 167 and washer 168. Bolt 169 threadedly cooperates with head 155 and through washer 168 clamps bearing 166 against face 167, that is, between washer 168 and face 167. Head 155 is shown in FIGS. 14 and 15 in association with set-up fitting 170 and center-point 171. Fitting 170 has a hub 172 integral with diametrally extending bar portion 173. Bar portion 173 has a flat planar face 173f in a plane extending perpendicularly to the axis of hub 172. Ball bearing 166 is mounted coaxially in hub 172 between radial shoulder face 174 and bearing retaining ring 175. Bearing 166 is mounted annularly upon head shoulder 164 between washer 168 and radial face 167 as described above. After bolt 169 is tightened to secure the inner race of bearing 166 in fixed relation to the head 155, the cylindrical body portion of center-point 171 is slid into the central bore of hub 172, placing the point 171p on the axis of hub 172. To position arm 151 and the structure carried by it in correct relation to a wheel in cooperative supporting relation to rollers carried on shafts supported by carriage 50', that is, roller 52' and rollers corresponding to rollers 51 and 53, handle 159' is moved to rotate nut 159 to unlock tang 155'. Head 155 with its integral tang 155' is swung about pivot bolt 156 into centered relation, and handle 159' is then swung to advance lock nut 159 to lock tang 155' in that centered position. In the centered position potentiometer 34' is centered and the axis of center-point 171 and hub 172 coincides with the axis of arm 151. Bar portion 173 is placed in a horizontally extending position and lock handle 152 actuated to unlock bar 151 for axial sliding movement while indexing pin 130 precludes rotation of bar 151 about its longitudinal axis. Bar 151 is advanced toward wheel 23' until face 173$f$ of bar 173 engages the near side wall of the tire 49' mounted on wheel 23'. If incident to such advancement of arm 151, center-point 171 engages any portion of the wheel, further advancement of arm 151 toward the wheel simply effects telescoping of center-point 171 into hub 172. If center-point 171$p$ is not aligned with the center hole 176' in spindle 176 upon which wheel 23' is mounted by lug bolt 177 in cooperation with lug nut 178, lock handle 150 is actuated to unlock carrier 147 for vertical movement along column 145 to adjust the height of center-point 171$p$ so that same enters axially into center hole 176°. When center-point 171$p$ is so aligned with center hole 176', carrier 147 is locked to column 145 by operation of lock handle 150 and with bar face 173$f$ extending horizontally in engagement with the side wall of tire 49', lock handle 152 is actuated to lock arm 151 against further axial movement if set-up fitting 170 is to also be used as a camber sensing fitting.

When camber sensing fitting 179 is to be used, lock handle 152 is not actuated to lock arm 151 so that same may be moved axially away from wheel 23' and tire 49'. Center-point 171 is then withdrawn from hub 172 and bolt 169 with washer 168 removed from head 155 and set-up fitting 170 with its associated bearing 166 withdrawn from shoulder portion 164 and laid aside. Camber sensing fitting 179 is shown in FIGS. 11, 12 and 13. Fitting 179 has a hub 180 in which a ball bearing 166 is co-axially mounted. Bearing 166 is secured in place by bearing retaining rings 181, 182. A plurality of spoke-like arms 183 extend radially outward from hub 180. A frusto-conic rim 184 is secured to the outer ends of arms 183 and is thereby supported in coaxial relation with the axis of rotation of bearing 166. Lock actuating handle 152 is then actuated to unlock arm 151, and the latter is advanced axially toward wheel 23'. As frusto-conic rim 184 moves into engagement with the tire bead supporting portion 185 of wheel 23', handle 159' is swung to back off lock nut 159 so as to free tang 155' for pivotal movement about pivot bolt 156, and arm 151 is then advanced to place rim 184 in substantially circular line contact with the rim of wheel 23' before lock handle 152 is actuated to lock arm 151 in fixed relation to carrier 147.

As rim 184 is placed in line contact with the rim of wheel 23' as above described, head 155 with its tang 155' is free to pivot about pivot bolt 156. Camber may then be read while wheel 23' is stationary or rotating in cooperation with roller 52'. If no pivoting of tang 155' occurs, the potentiometer 34' remains at its zero position to indicate zero camber, and if pivoting does occur, then the potentiometer 34' is actuated to move into a corresponding position relative to the degree of positive or negative camber present in the front suspension of the vehicle of which wheel 23' is a part.

The potentiometer 34' is connected by electrical conductors included in cable 102', shown in FIGS. 11, 12 and 13. Cable 102' extends from potentiometer 34' through an insulative bushing 185 of rubber or the like supported in the protective housing 165 and thence downwardly adjacent column 145 upon which it is supported by cable supports 188 to a jack plug 189 which is engaged in a receptacle provided in flange 57'. From receptacle 57' appropriate conductor containing cable 102 is routed to the control console 33 upon a convenient path, as desired.

As the wheels, of which 23' is one, are turned, the respective cooperating carriages 50' assume positions of alignment relative to the respective wheels. As each carriage preferably supports camber sensing structure on side flange 57' thereof, simultaneous corresponding correlated value readings of camber and toe-in or toe-out are presented on the console 33 which in this case would have an additional camber indicating galvanometer 36. Such correlated readings can be taken with the wheels in straight ahead relation or in selected leftward or rightward turning attitudes between straight ahead and locked positions.

If desired, the camber sensing fitting 179 may have a hub like that of set-up fitting 170 with a center-point 171. Such a modified fitting 179 may be used as a set-up fitting as well with the frusto-conic rim 184 and center-point 171 respectively co-acting with the wheel rim and spindle center-hole as the arm 151 is moved axially and the height of the carrier 147 is adjustile lock nut 159 and the locks actuatable by lock handles 150 and 152 are released.

Similarly, when the vehicle to be aligned has wheels which due to size or other feature of construction will not properly cooperate with the frusto-conic face of fitting 179, fitting 170 may be used. In such case set-up fitting 170 is left in place on head 155 and in engagement with tire 49' and lock handle 152 actuated to lock arm 151 as described above. The head tang 155' is unlocked by actuating handle 159' to unlock nut 159. Camber can then be sensed through fitting 170 in cooperative engagement with tire 49' rotating under forces applied by roller 52'.

The alignment indicating device illustrated in the drawings and described above is subject to structural modification without departing from the spirit and scope of the appended claims.

Having described my invention, what I claim as new and desire to secure by letters patent is:

1. A camber indicating device which comprises a carriage, a plurality of parallel spaced horizontal rollers rotatably mounted on the carriage and arranged to support a tire of a vehicle for rotating the tire and a wheel of the vehicle on which the tire is mounted, a support frame mounted on the carriage and extending upwardly therefrom to a position opposite a center of the wheel, a horizontal frame mounted on the support frame and alignable with a center of the wheel, a head member pivotally mounted on the horizontal frame, a wheel sensing frame rotatably mounted on the head, means on the wheel sensing frame for alignment transversely of the axis of the wheel, means for indicating the angle between the horizontal frame and the head member, and means for rotating one of the rollers to turn the tire and wheel, the indicating means indicating camber of the wheel.

2. A camber indicating device as in claim 1 wherein there is means for mounting the carriage for rotating about a vertical axis, and means is provided for indicating the degree of turning of the carriage about the vertical axis to indicate alignment of the wheel.

3. A device for indicating alignment of a pair of wheels of a vehicle comprising in combination a plurality of first means each respectively supporting a wheel for rotation and for pivoting about a vertical axis in the center plane of the tread, second means supported on said first means outboard of the wheel, sensing means pivoted on said second means about a horizontal axis, said sensing means contacting said wheel at a plurality of points in a contact plane perpendicular to the axis of wheel rotation and rotatable with said wheel about an axis intersecting said contact plane at the point the wheel axis intersects same, a plurality of position transmitting means each connected to a respective position indicating means, each first means actuating a transmitting means to cause the connected position indicating means to indicate the toe-in or toe-out of the respective wheel supported on said first means, each sensing means actuating a transmitting means to cause the connected position indicating means to indicate the camber of a respective wheel engaged by the sensing means whereby correlated values of toe-in, toe-out and camber of each wheel are simultaneously indicated for any steering position in which the wheels are supported between full lock right and full lock left limits.

4. A device for indicating alignment of wheels steerable by steering gear of a vehicle while engaging said wheels, which comprises a platform including two trucks coupled by means retaining the trucks against change in relative orientation while permitting translatory movement of at least one truck toward and away from the other truck, a pair of carriages mounted on said pair of platform trucks for swinging substantially horizontally, a plurality of rollers rotatably mounted on each carriage for supportingly engaging the tread of a respective wheel with the axis of the wheel intersecting the axis of carriage swinging, a plurality of roller means rotatably mounted on said carriage to cooperate with the wheel and center the wheel on the carriage, and thereby cause the platform trucks to assume a spacing related to the spacing of the wheels, a potentiometer connected to each carriage, a movable contact of each potentiometer being displaceable to a degree determined by the swing of the carriage associated therewith, camber sensing means on at least one carriage engaging the wheel at a plurality of points in a plane perpendicular to the axis of wheel rotation and rotatable with the wheel, said means engaging the wheel being supported for pivoting about a horizontal axis parallel to said plane of engagement and supported on said carriage, a potentiometer supported on said carriage and having a movable contact connected to said sensing means and displaced to a degree determined by the camber of the wheel engaged by the sensing means, a console, a plurality of galvanometers each connected to a respective one of said potentiometers, the galvanometers connected to the potentiometers having contacts displaced by carriage swing indicating respective wheel toe-in and toe-out and the galvanometers connected to potentiometers having contacts displaced by camber sensing means indicating respective wheel camber whereby simultaneous correlated values of camber and toe-in toe-out of the wheels are displayed for any position of the steering gear of the vehicle.

5. A device in accordance with claim 4 characterized by the fact that the roller means centering the wheel on the carriage selectively centers wheels having tread widths within any of a plurality of ranges and comprises at least one pair of opposed rollers disposed coaxially with and laterally of a wheel tread engaging roller, that each centering roller is freely rotatable relative to and axially movable toward and away from said tread engaging roller, that spring means are interposed between the carriage and each centering roller and at least one spacing member is positionable between each spring and the carriage such that the spring acts against the centering roller to urge same toward the tread engaging roller while also cooperating with and urging the spacing member to engage means securing it relative to said carriage, the spacing member being disengageable from the retaining means by advancing same toward the centering roller to disengage it from means securing it to said carriage and then advancing said spacing member substantially at right angles to said first movement to disengage it from the spring whereby the centering rollers spacing may be enlarged to cooperate with wheels having wider tread faces.

6. A device in accordance with claim 4 characterized by the fact that said camber sensing means support comprises an upright column, a carrier movable up and down said column and lockable thereon at elevation as selected, a non-rotatable, horizontal arm supported in said carrier and slidable toward and away from a wheel centered on said carriage into a position as selected and lockable in relation to said carrier, and pivotal support means on said arm supporting said camber sensing means.

7. A device in accordance with claim 4 characterized by the fact that a camber sensing means comprises a frusto-conic contact surface secured in concentric relation to a hub journalled for rotation about an axis pivotal in a radial plane about said horizontal axis.

8. A device in accordance with claim 4 characterized by the fact that the camber sensing means comprises a hub having a pair of radially extending arms presenting a wheel contacting surface perpendicular to the axis of the hub, the hub being supported for rotation about an axis swingable in a radial plane of said horizontal axis, and a center point telescopically supported in the hub having a point co-axial with the axis of rotation of the hub and adapted to cooperate with the center hole of the wheel spindle for positioning the camber sensing means in relation to a wheel.

9. A device for determining the camber of a vehicle wheel which comprises a column, a hinge mounted on the column, means for attaching the column to the wheel in perpendicular relation to the axis of the wheel with the hinge axis parallel to a plane perpendicular to the wheel axis, an actuator arm pivotally mounted on said hinge, means for indicating a horizontal position of the actuator arm, means for generating a signal related to the angle between the actuator arm and the column, means actuatable by said signal to display the corresponding value meansurement of camber of said wheel, and wherein the means for indicating the angle between the actuator arm and the column comprises a potentiometer connected to the actuator arm and to the column, a moveable contact of the petentiometer being displaced to a degree determined by the swing of the actuator arm upon the hinge, and a galvanometer registering the degree of displacement of the moveable contact.

10. A device for determining the camber of a vehicle wheel which comprises a column, a hinge mounted on the column, means for attaching the column to the wheel in perpendicular relation to the axis of the wheel with the hinge axis parallel to a plane perpendicular to the wheel axis, an actuator arm pivotally mounted on said hinge, means for indicating a horizontal position of the actuator arm, means for generating a signal related to angle between the actuator arm and the column, means actuatable by said signal to display the corresponding value measurement of camber of said wheel, and wherein the means for indicating the angle between the actuator arm and the column comprises a stationary means mounted on the column and movable means mounted on the actuator arm comprising a potentiometer, the movable means being displaced relative to the stationary means to a degree determined by the swing of the actuator arm upon the hinge, and a galvanometer registering the degree of displacement of the movable means.

* * * * *